Feb. 7, 1967  H. G. TIETJE  3,302,615
CONTROLLED ENVIRONMENTAL SYSTEM FOR HANDLING
AND REARING LABORATORY
AND RESEARCH ANIMALS

Filed April 15, 1965  5 Sheets-Sheet 1

INVENTOR
HELMUT G. TIETJE
BY
Kane, Dalsimer + Kane
ATTORNEYS

Feb. 7, 1967  H. G. TIETJE  3,302,615
CONTROLLED ENVIRONMENTAL SYSTEM FOR HANDLING
AND REARING LABORATORY
AND RESEARCH ANIMALS
Filed April 15, 1965  5 Sheets-Sheet 4

INVENTOR.
HELMUT G. TIETJE
BY
Kane, Dalsimer & Kane
ATTORNEYS

INVENTOR
HELMUT G. TIETJE

United States Patent Office 3,302,615
Patented Feb. 7, 1967

3,302,615
CONTROLLED ENVIRONMENTAL SYSTEM FOR HANDLING AND REARING LABORATORY AND RESEARCH ANIMALS
Helmut G. Tietje, Westwood, N.J., assignor to Becton, Dickinson and Company, East Rutherford, N.J., a corporation of New Jersey
Filed Apr. 15, 1965, Ser. No. 448,536
27 Claims. (Cl. 119—15)

This invention relates to a controlled environmental system for laboratory and research purposes having particular application to the housing, handling and rearing of animals and peculiarly adapted for germ-free strains.

Heretofore, laboratory animals, in large or small quantities have been contained in various units which inevitably, possess inherent disadvantages such as inefficient utilization of space, restriction in handling particular animals and difficulty in assuring and maintaining germ-free conditions. Thus, conventional glove type isolators are used in conjunction with multi-level shelf structures. A staircase is required to obtain access to the uppermost isolators and, in several instances, a fork-lift is required to be used for helping place the uppermost isolators in position or for removal from the shelving unit so that the contained animals may be handled for one reason or another. In such installations, it would be advantageous to maintain the individual isolators on the lowermost shelves at a relatively low elevation.

The prior art has also proposed a jacket type isolator which is required to be elevated a number of feet above ground level to provide access to central portions thereof. At this location, the operator places himself in a jacket for purposes of entry to the isolator. Inasmuch as the operator is fully encased in a jacket, there is the inherent danger of suffocation. For this reason, operators are required to carry a knife or suitable implement for cutting through the jacket should the need arise.

With respect to these prior art units, it will be evident that there is not only ineffectual use of space but impractical and unwieldy handling of animals which in turn does not minimize the danger of contaminating the germ-free surroundings for animals or other forms of life or controlled environmental conditions therefor.

It is, therefore, a principal object of this invention to take full advantage of the available room space and particularly the room height which would hold to a minimum the required horizontal dimensions of a unit for containing animals.

A further object is to eliminate the disadvantages of the prior art units by providing a unit that minimizes horizontal dimensions by providing maximum use of vertical dimensions without operator inconvenience.

A still further object is to provide a controlled environmental system of this type in which animal transfer and other procedures involving animal feeding, watering, bedding are more sophisticated while holding potential risks of contamination to a minimum.

Still another object is to provide a controlled environmental system of this type employing a novel autoclave intimately associated with the housing or controlled environmental units and through which everything entering and leaving the housing units is adapted to pass once the system is in operation after initial start-up.

A still further object is to provide a system of this type in which a housing unit capable of maintaining controlled environmental conditions peculiarly adapted for the handling of germ-free animals is incorporated.

In carrying out the present invention, individual housing units are contemplated for providing a controlled environment together with a central autoclaving unit, which assures the maintenance of the selected environment. Each housing unit will require a minimum of floor space and is capable of taking advantage of a maximum amount of the available floor to ceiling dimension. As the name implies, each housing unit is capable of creating and maintaining a preselected, controlled environment thereby rendering it possible to house an optimum number of animals therein. For such purposes, a Ferris wheel type of assembly is provided in which a number of animal trays are mounted on a Ferris wheel carriage which is conveniently actuated to raise or lower a particular tray or bring it to a preselected location. For example, this location may embrace a working area at which an operator or technician, through the use of sleeve and glove assemblies of the type well known in the industry can perform the desired task which could include feeding and changing the bedding of the animals.

At least one and up to four or more of these housing units can be assembled with an autoclaving unit serving to eliminate the time consuming and error prone conventional technique by permitting autoclaving of everything that goes in and out of the housing units. Therefore, it is possible to create and maintain germ-free or controlled environmental conditions within the individual housing units. By the same token, the present invention has application to the maintenance of germ-free conditions exteriorly of the housing units and autoclaving unit when it is desired to house germs or other contaminants therein.

Other objects and advantages will become apparent from the following detailed description which is to be taken in conjunction with the accompanying drawings illustrating somewhat diagrammatically a preferred embodiment of this invention in which.

Figure 1:
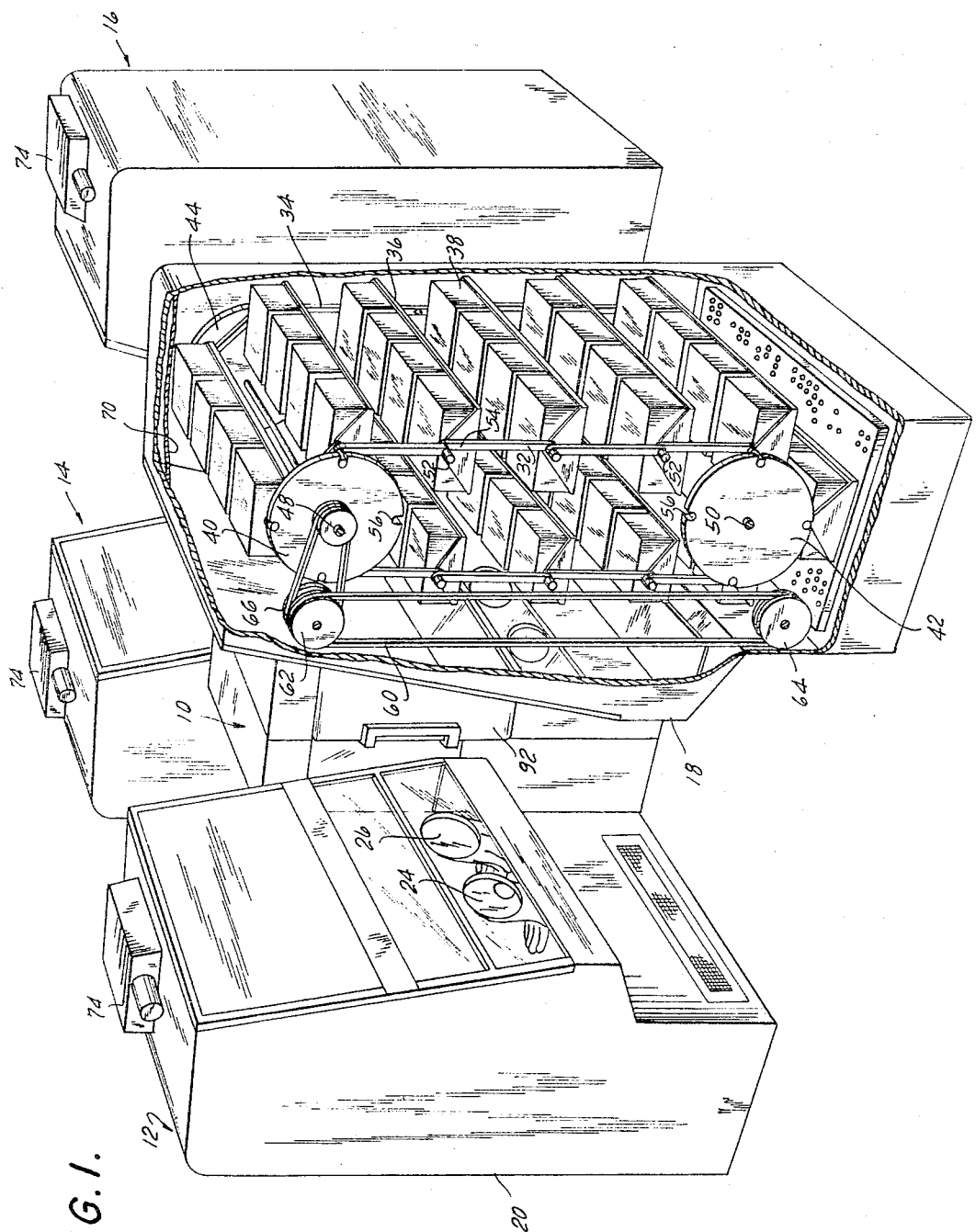
FIG. 1 is a perspective view of a controlled environmental system incorporating the teachings of this invention employing a centrally located autoclaving unit and four housing units associated therewith, with certain parts broken away and removed.
Figure 2:
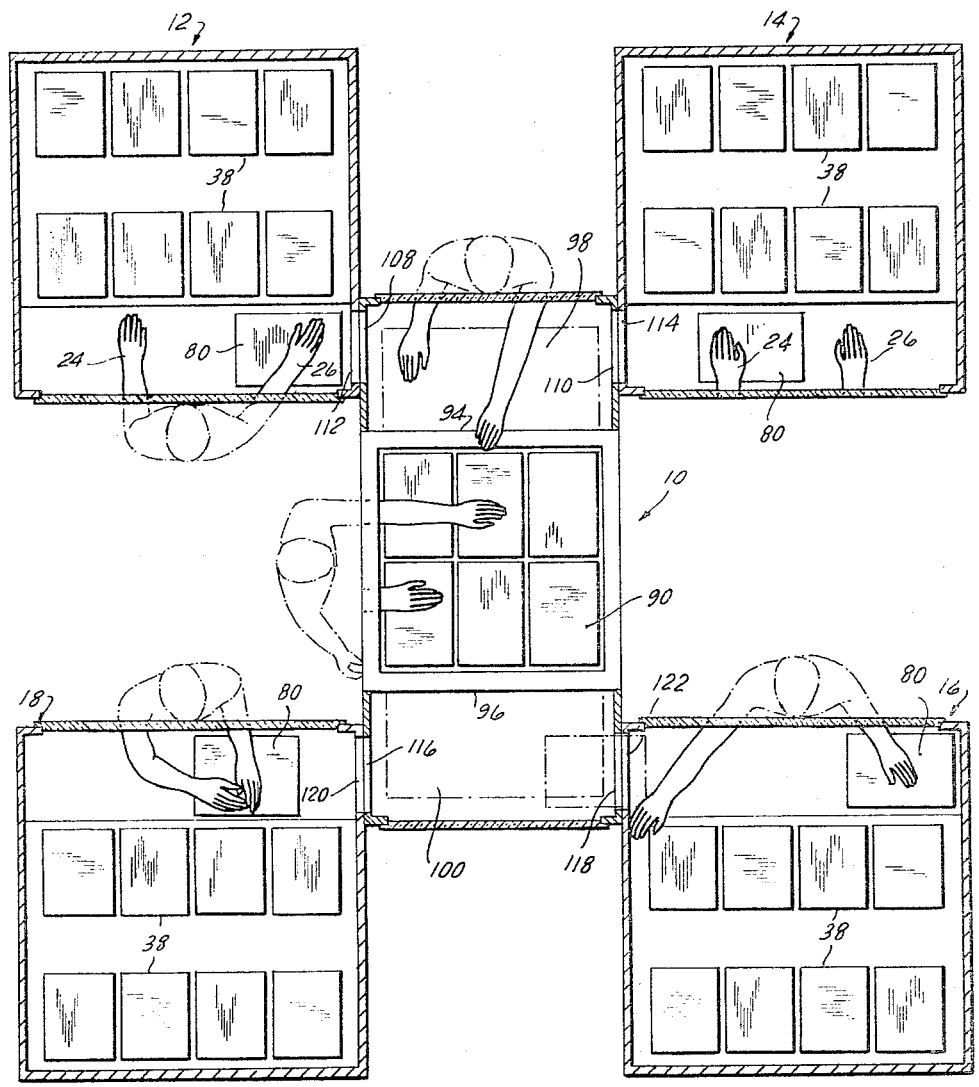
FIG. 2 is a diagrammatic top plan view of this controlled environmental system illustrating the manner of working within the housing units and conveying and transport of things thereto and therefrom via the central autoclaving unit.
Figure 3:
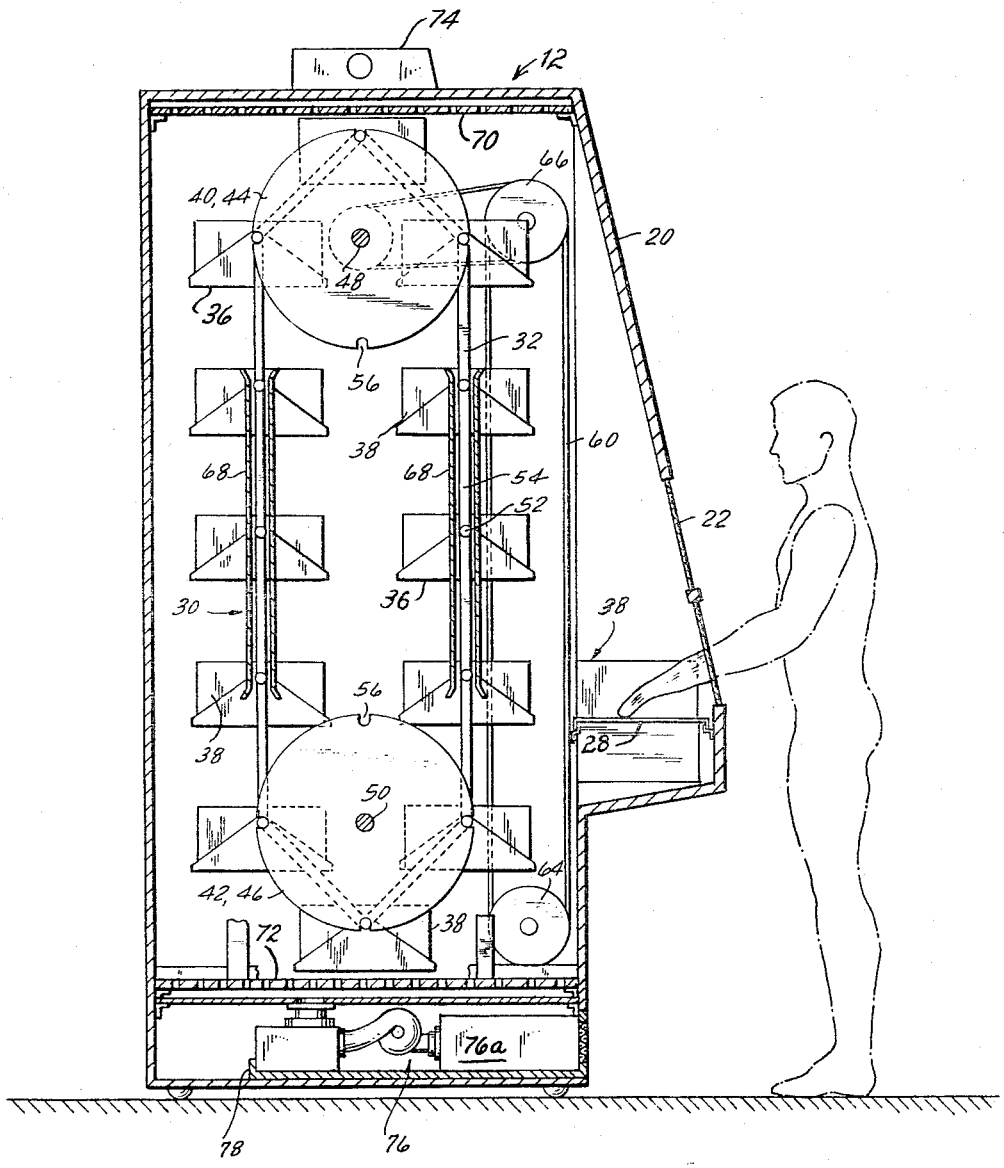
FIG. 3 is a longitudinal sectional view of a housing unit of this invention.
Figure 4:
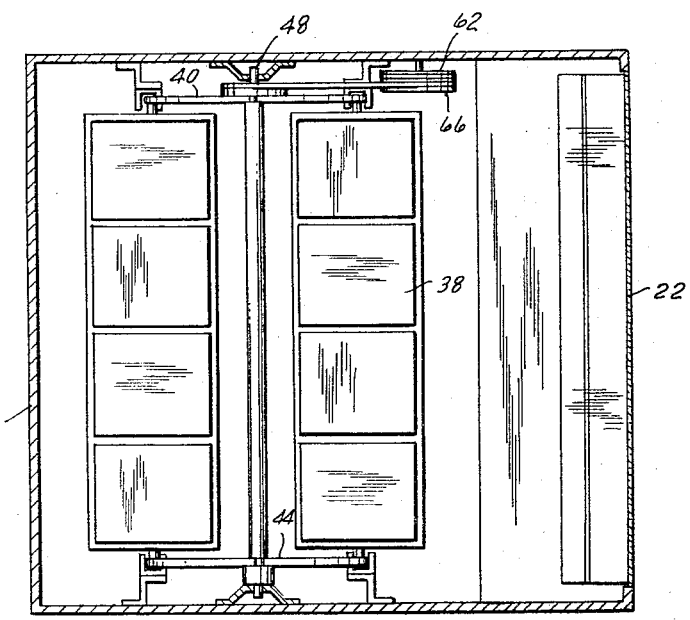
FIG. 4 is a top plan view of this housing unit.
Figure 7:
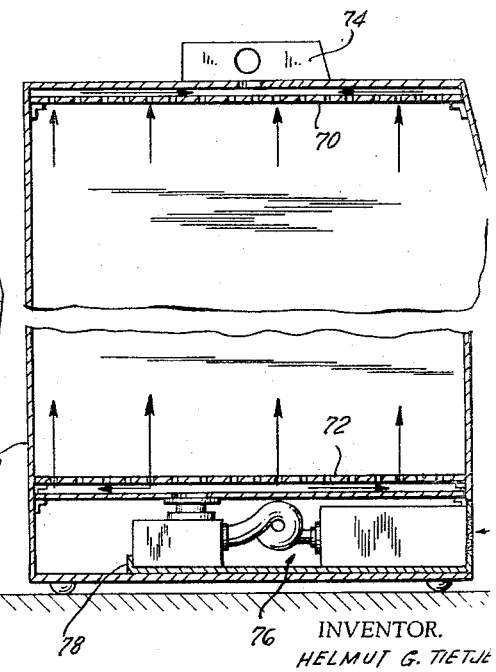
FIG. 7 is a fragmentary perspective view of this housing unit.
Figure 8:
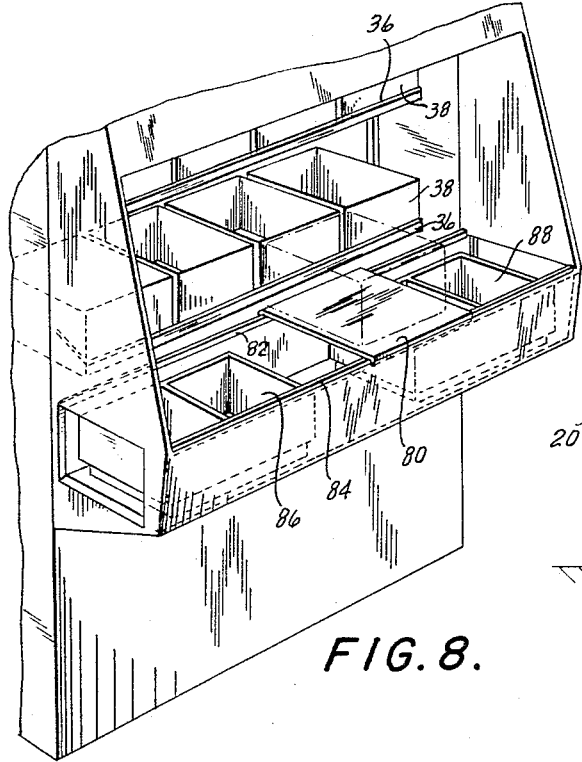
FIG. 8 is a longitudinal sectional view of a housing unit of the invention with the central portion broken away and removed and arrows showing the air flow path.
Figure 5:
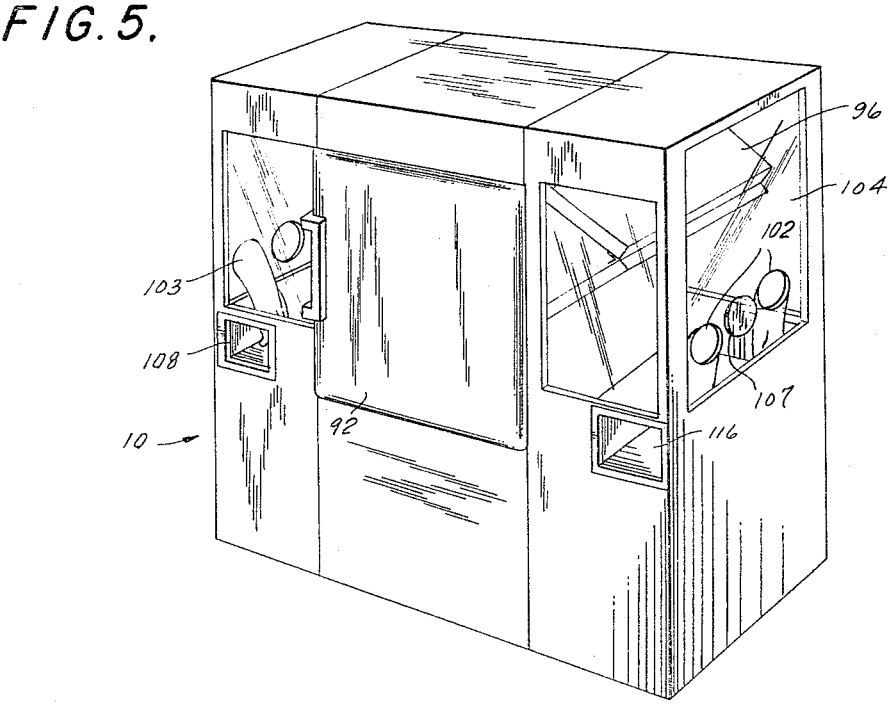
FIG. 5 is a perspective view of an autoclaving unit employable with the present invention.
Figure 6:
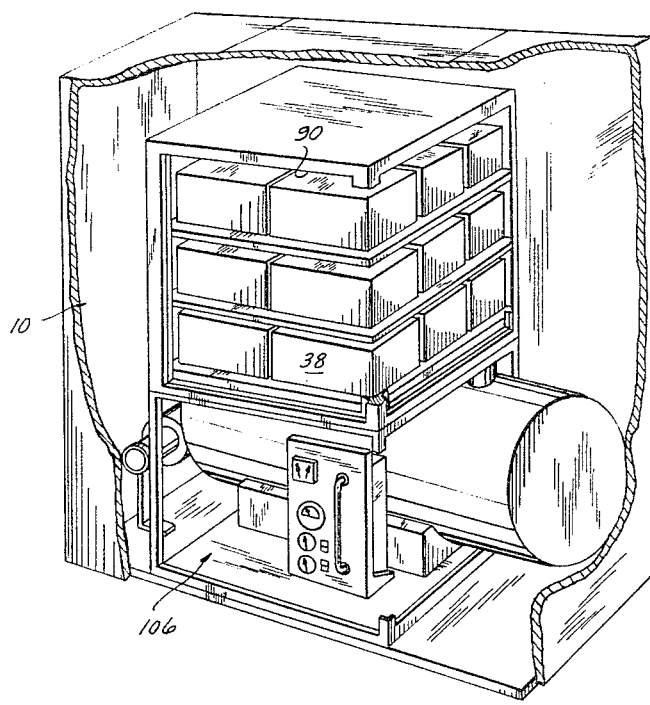
FIG. 6 is a similar perspective view with certain parts broken away and removed for purposes of showing a typical layout of the contemplated autoclaving unit.

In the drawings, a centrally located autoclaving unit 10 is shown associated with four substantially identical housing units 12, 14, 16 and 18 in forming the contemplated controlled environmental system of this invention. It should be understood at this point that any number of housing units may be coupled in one way or another with the autoclaving unit; or the system may adapt more than one autoclaving unit. In a preferred embodiment of this invention, four housing units are advantageously coupled with a centrally located autoclaving unit as typified by the drawings herein.

Referring now to the housing units, it will be evident that each comprises an outer casing 20 which is preferably of sufficient structural strength and of material capable of resisting the contemplated loads, pressures, degradation and corrosive action to which it would ordinarily be exposed and, at the same time, be adequately sealed and airtight. For such purposes, a suitable stainless steel or other metal, suitable plastic or organic resin may be employed. The casing 20 is predominantly opaque particularly for purposes of housing animals of the mice family which are essentially nocturnal; and, therefore, artificially controlled interior lighting may be employed. The front of each unit includes a window 22 provided with a pair of sleeve and glove assemblies of the usual type 24 and 26 to receive the hands of an operator or technician. A table 28 is also conveniently located at the window interiorly of the housing 20 to provide a work area.

A conveyor 30 is mounted interiorly of the housing 20 and is adapted to mount a predetermined number of animal trays or cages and, when desired, transport a particular tray or series of trays to the working area at the front of the housing. This conveyor comprises a pair of spaced link chains 32 and 34 between which are pivotally suspended shelves or platforms 36 on which the animal trays or cages 38 are supported. The chains 32 and 34 are mounted on wheels 40 and 42, in the one case, and 44 and 46 in the other. Wheels 40 and 44 are keyed onto a shaft 48 the ends of which are suitable journaled and bracketed on the interior of the housing 20. The wheels 42 and 46 are similarly keyed to a shaft 50 journaled for rotation and bracketed on the interior of the housing 20. It will be noted that the shelves 36 are pivotal at the joint 52 between the individual links 54 of the chains 32. This joint is adapted to be received by one of a number of notches 56 provided in each of the wheels thereby providing for controlled actuation of the conveyor 30.

The conveyor 30 may be manually actuated or automatically operated by a suitable motor drive. In the disclosed embodiment, manual actuation is employed. In this connection, a hand line 60 in the form of a pulley is mounted on a pair of spaced pulley wheels 62 and 64 suitably journaled on the interior of the housing 20. Another pulley 66 extends between the upper pulley wheel 62 and the notched wheel 40. By merely directing the hand line 60 in an upwardly or downwardly direction, the conveyor 30 will be moved in a corresponding direction.

If desired or necessary, a network of guide channels 68 may be provided and arranged to extend inwardly from the interior of the housing 20 to thereby guide the chains 32 and 34 upon actuation of the conveyor 30.

Inasmuch as the weight of the conveyor 30 is distributed equally on both sides of the rotatable shafts 48 and 50, negligible effort and force is required to actuate the conveyor.

An optimum number of animal trays 38 and, consequently, animals may be contained within the individual units by efficiently utilizing the available air space and the incorporation of a preselected air flow rate and characteristic interiorly of the units.

Ordinarily ten to twenty mice per cage is contemplated by the present invention and it should be understood that the capacity of any particular cage or controlled environmental unit is not limited and the range will vary depending upon the conditions and rapidity at which the air is circulated through the individual units. This is accomplished by a forced air circulation system comprising an upper and lower perforated intake and exhaust baffle boards 70 and 72 for even air distribution. The exhaust air passes through an exhaust filter 74 which may include a blower if desired. In this manner, the exterior of the units and surroundings are protected from possible animal pathogens or other contaminating media. The exhaust air filter, naturally, would be of the replaceable type in order that a fresh filter may be introduced with each use or periodically replaced. Below the baffle board 72 is a blower and filter assembly 76 which may conveniently be mounted on a tray 78 which may be slide mounted for relatively quick disconnect to provide access to the power equipment for either substitution or servicing without detrimentally affecting the controlled environment within the unit. It should be understood that the instant invention also contemplates the inclusion of a suitable air temperature control unit 76a which may embrace a heater as well as a cooler along with the assembly 76 on the tray 78.

Referring now to the working area of each of the controlled environment units and particularly the table 28, the working surface may include one or more slide tables 80. This glidable table is adapted to travel on a pair of spaced runners 82 and 84 and above a recess area within which a waste tray 86 and food tray 88 may be disposed together with other trays and paraphernalia including instruments and surgical equipment. In the illustrated embodiment, the trays for both waste and food may be formed of an integrally molded unit each of which has two compartments. Obviously, a single compartment tray may be employed.

Referring now to the autoclaving unit 10, it will be recalled that it is advantageously coupled with each of the controlled environmental units 12, 14, 16 and 18 in an airtight, sealed manner. The operation of this autoclaving unit assures that everything entering the controlled environmental units is in a sterile and substantially germ-free condition. As discussed in the above, the reverse conditions may exist whereby the autoclaving unit 10 will assure that the exterior or ambient is not contaminated by the conditions with the units 12, 14, 16 and 18. Thus, the autoclaving unit 10 will include a sterilizing compartment 90 in which the sterilization takes place. The interior of the compartment 90 may be provided with suitable shelving in order to efficiently utilize the available space for autoclaving. A sealable access door 92 facilitates loading of the compartment 90 with material to be sterilized whether dry goods or liquids. A pair of hinged doors 94 and 96 is shiftable from a lowered closed position at which they cooperate in sealing the interior of the compartment 90 and a raised position at which access may be had to the compartment 90 to remove sterilized material therefrom and transfer it to the transfer compartments 98 and 100, respectively. In order to work within the transfer compartments 98 and 100, each is provided with a pair of sleeve and glove assemblies 102 and 103 of the standard type.

The autoclaving or sterilizing mechanism 106 may be mounted at the base of the autoclaving unit and may comprise the usual steam generator temperature control units and vacuum equipment and other accessory assemblies for performing the desired autoclaving cycle. The autoclaving unit may also have a supplementary gas sterilization system for initially sterilizing the entire system. It is possible to also use a gas such as ethylene oxide instead of high temperature steam to sterilize temperature sensitive items in the autoclave.

The transfer compartments 98 and 100 are also provided with ports 108 and 110 which align with ports 112 and 114, respectively. The other transfer compartment 100 is provided with ports 116 and 118 which align with ports 120 and 122, respectively, of the controlled environmental units. In this maner, the working area of each controlled environmental unit is adapted to communicate with the transfer compartments of the autoclaving unit 10.

The autoclaving unit doors 94 and 96 may, on the other hand, be one-piece and pivot at the top or bottom from a closed position to an open position into the transfer areas 98 and 100 and, in the later case, onto the bottom of the respective transfer areas to provide a working floor.

Where desired, the windows 104 and 105 may be extended to include part of the top of the autoclaving unit as well as the sides as shown. In addition, one or more of the window areas 104 and 105 may be provided with sealable transfer ports 107.

The cabinet of the autoclaving unit 10 may be suitably recessed at the ends to provide knee space where desirable or an essentially solid member as shown.

In lieu of the built-in power unit and steam generator in the base of the autoclaving unit, a stand may be substituted and the components in the base transferred to a remote location. In this manner, a single generator and ancillary equipment can be employed to serve a number of autoclaving units when dictated by the particular installation.

The windows 104 and 105 may be disposed at an angle for easier visibility. In lieu of the aforementioned knee recess, a possible storage area can be incorporated accessibly with or without the use of doors.

Suffice it to say that the doors of the autoclaving unit may be of the electrically interlocking type whereby a preventative is provided for opening any of the three doors during the sterilization cycle and thereafter from keeping more than one door open at any given time. Pilot lights could be employed to indicate when the opposite door is closed. In addition, the automatic sterilization cycle will not be started until all of the doors are closed. Initial and final vacuum providing means may be incorporated in the autoclaving unit for purposes of removing air and moisture from the chamber 90. The initial vacuum will assure a faster and more complete heat penetration of the load whereas the final vacuum assures a more arid load.

In loading a particular controlled environmental unit with food, water, bedding or the like, the doors 94 and 96 are closed and door 92 is opened and loaded with the desired material to be autoclaved. The autoclave unit is set at the desired cycle depending on whether liquids or dry goods are being processed and the desired temperature for autoclaving is checked and reset where necessary. A time and temperature chart may be employed as a reference together with a pressure graph for purposes of setting the pressure indicator for the generated steam. If not previously loaded, the chamber 90 is loaded and door 92 is closed.

The typical autoclaving cycle will, in the case of dry goods, include an initial removal through the operation of a vacuum pump of air pressure and moisture from the chamber 90. The sterilization part of the cycle commences whereby the chamber pressure builds up to set the steam pressure and temperature selected. An indicator light may now go on to show that the sterilization part of the cycle has now begun. The time sterilization part of the cycle, regulated by a suitable timer, proceeds to termination. Suitable safety means may be incorporated to compensate for the eventuality of the temperature falling below the programmed temperature. In this event, the timer of the sterilization part of the cycle may reset and return to its original starting position not commencing only when the desired temperature is reached.

If a liquid sterilization cycle is employed, the sterilization part of the cycle above described may be employed.

The chamber 90 may be vented after the sterilization cycle in the case of dry goods whereby steam is removed from the chamber. A final vacuum may be drawn together with the use of a cooling interval whereby the temperature of both the chamber 90 and the dry goods is reduced. This cooling cycle may also be employed in the case of autoclaving of liquids.

When the desired cycle of operation of the autoclaving unit 10 has reached completion, the doors 94 and 96 may now be opened for purposes of removing the load and transferring them to the respective transfer areas 98 and 100 to the selected controlled environmental unit 12, 14, 16, or 18. The cycle of operation may be repeated at will be merely reloading and programming the next autoclaving cycle in the above fashion.

In the event that it is desired to load the autoclaving unit 10 from the controlled environmental units 12, 14, 16 and 18, it will be assumed at this point that the chamber 90 is under sterile conditions. If not, then the desired sterilization or autoclaving cycle is run. The end doors 94 and 96 may now be opened and loaded. The autoclaving cycle is now programmed and set, if not already done so. The end doors 94 and 96 are closed and the sterilization cycle is run, assuring that the ambient atmosphere or surroundings may not be contaminated in one way or another by the material removed from the units 12, 14, 16 and 18.

Where it is desired to load the controlled environmental units 12, 14, 16 and 18 with animals, the interiors of the autoclave unit and housing modules are initially sterilized by flooding them with ethylene oxide or other material used for such purposes which may be supplied by the autoclaving unit. Then the conventional glove isolator and transfer techniques may be employed once the desired sterile conditions have been reached to introduce the animals particularly through the sealable ports 105 or other ports that may be conveniently located in the system.

Thus, everything except the animals themselves pass through the autoclaving unit 10. When it is desired to remove the animals, however, the autoclaving unit 10 is run through its sterilization cycle perhaps with a suitable animal transport therein. Following the completion of the cycle including cooling of the compartment 90, the animals are then introduced into the chamber through the selected animal transports and then removed.

Thus, among others, the several aforenoted objects and advantages are most effectively attained. Although a single somewhat preferred embodiment of the invention has been disclosed and described in detail herein, it should be understood that this invention is in no sense limited thereby and its scope is to be determined by that of the appended claims.

I claim:

1. A housing unit for a controlled environment system having an interior adapted to be subjected to controlled environmental conditions comprising a filtered air supply means adapted to introduce air into the interior of the housing unit at a predetermined rate, filtered air supply means directing an air stream interiorly of the housing unit in a substantially vertical direction, said filtered air supply means including a pair of spaced baffle plates each of which is provided with a plurality of openings therein with one plate being placed at the bottom of the housing unit interior and the other plate being placed at the top of the housing unit interior whereupon the stream of air is adapted to be evenly distributed across the interior by passage through the openings in the baffle plates.

2. The invention in accordance with claim 1 wherein a filtered exhaust is incorporated as part of said means for filtering the air discharged from the interior of the housing unit.

3. The invention in accordance with claim 1 wherein the filtered air supply includes an air pump and filter unit located exteriorly of said interior, said housing unit including a tray slidable into and out of said unit, said tray mounting said air pump and filter unit to facilitate servicing thereof.

4. A controlled environmental system comprising:
a sterilizing unit having a compartment adapted to be subjected to sterilizing conditions;
and at least one housing unit in communication with the sterilizing unit and having an interior adapted to be subjected to controlled environmental conditions, and a filtered air supply means introducing air into the interior of the housing unit at a predetermined rate, filtered air supply means directing an air stream interiorly of the housing unit in a substantially vertical direction, said filtered air supply means including a pair of spaced baffle plates each of which is provided with a plurality of openings therein with one plate being placed at the bottom of the housing unit interior and the other plate being placed at the top of the housing unit interior whereupon the stream of air is adapted to be evenly distributed across the interior by passage through the openings in the baffle plates.

5. A controlled environment system for handling and rearing of animals and other forms of life and for resting on the floor of a room comprising:
   a sterilizing unit having a compartment adapted to be subjected to sterilizing conditions, said sterilizing unit having at least one access means for transferring matter to and from the unit;
   at least one housing unit in juxtaposition with respect to the sterilizing unit and having an interior adapted to be subjected to controlled environmental conditions, said housing unit having access means for transferring matter to and from the housing unit; and
   an atmosphere excluding connection between the sterilizing unit and housing unit interconnecting the access means of said units whereby matter may be transferred between said units through said access means without affecting the controlled environmental conditions.

6. The invention in accordance with claim 5 wherein said sterilizing unit has at least one working area, and at least one glove assembly projecting through the walls of the sterilizing unit into the working area.

7. The invention in accordance with claim 6 wherein at least one sealed transfer port communicates with the working area for purposes of transferring matter into and out of said area under sealed conditions.

8. The invention in accordance with claim 5 wherein said housing unit and sterilizing unit cooperate to define means whereby all matter entering and leaving said housing unit passes through the compartment of the sterilizing unit and is subjected to sterilizing conditions.

9. The invention in accordance with claim 5 wherein four of said housing units are in communication with the sterilizing unit.

10. The invention in accordance with claim 5 wherein the housing unit includes a working area including a table to facilitate working in the area.

11. The invention in accordance with claim 10 wherein the working area also includes mounting means for trays adapted to contain food and bedding for laboratory animals when such animals are housed in the housing unit.

12. The invention in accordance with claim 11 wherein means are provided for slidably supporting the table over the trays.

13. The invention in accordance with claim 10 wherein at least one glove assembly projects into the working area to facilitate handling material therein.

14. The invention in accordance with claim 5 wherein a filtered air supply means is provided for introducing air into the interior of the housing unit at a predetermined rate.

15. The invention in accordance with claim 14 wherein a filtered exhaust is incorporated as part of said means for filtering the air discharged from the interior of the housing unit.

16. The invention in accordance with claim 14 wherein the filtered air supply includes an air pump and filter unit located exteriorly of said interior, said housing unit including a tray slidable into and out of said housing unit, said tray mounting said air pump and filter unit to facilitate servicing thereof.

17. The invention in accordance with claim 5 wherein a conveyor is mounted in the interior of the housing unit and is adapted to be turned in a vertical direction about substantially horizontal axes, said conveyor mounted in the interior of the housing unit and adapted to be turned in a vertical direction about substantially horizontal axes, said conveyor having support means for supporting trays for containing animals to be subjected to the controlled environmental conditions, said conveyor adapted to be turned to locate the support means and trays thereon at a predetermined location.

18. The invention in accordance with claim 17 wherein said conveyor has equal weight distribution on each side of the vertically extending plane in which the horizontally disposed axes of rotation are located to thereby enable the conveyor to be turned with a minimum amount of force.

19. The invention in accordance with claim 18 wherein a manually operated pulley mechanism is rotatably coupled with said conveyor for permitting the conveyor to be manually actuated.

20. The invention in accordance with claim 17 wherein the tray support means includes a tray supporting platform pivotally mounted on said conveyor such that the platform is adatped to be suspended by means of gravity and be located in a substantially horizontal plane.

21. The invention in accordance with claim 20 wherein said conveyor comprises a pair of endless chains comprising linked bars and a pair of wheels for each chain rotatably interconnected with one another in causing the chains and, consequently, the conveyor to turn when actuated.

22. A housing unit for handling and rearing of animals and other forms of life forming part of a controlled environment system having an atmosphere excluding sealed housing defining an interior adapted to be subjected to controlled environmental conditions, a sealable access means for transferring matter to and from the interior, a filtered air supply means connected to the housing for introducing air into the interior of the housing unit at a predetermined rate and in a substantially given direction, a conveyor mounted in the interior of the housing unit and turning in a substantially vertical direction about a substantially horizontal axes, a cage tray supporting platform for supporting cage trays for containing animals to be subjected to the controlled environmental conditions, said conveyor adapted to be turned to locate the platform and trays thereon at a predetermined location, the cage tray supporting platform pivotally mounted on said conveyor and suspended by means of gravity and located in a substantially horizontal plane, said conveyor comprising a pair of endless chains and a pair of wheels for each chain rotatably interconnected with one another in causing the chains and, consequently, the conveyor to turn when actuated, the housing unit including a working area adjacent the conveyor including means for facilitating working in the area, and means for handling matter within the housing unit interior from the exterior of the housing unit without affecting the controlled environmental conditions.

23. The invention in accordance with claim 22 wherein the working area also includes mounting means for trays adapted to contain food and bedding for laboratory animals when such animals are housed in the housing unit.

24. The invention in accordance with claim 23 wherein a table is in the working area and means are provided for slidably supporting the table over the trays.

25. The invention in accordance with claim 23 wherein at least one glove assembly projects into the working area to facilitate handling material therein.

26. The invention in accordance with claim 22 wherein said conveyor has equal weight distribution on each side of the vertically extending plane in which the horizontally disposed axes of rotation are located to thereby enable the conveyor to be turned with a minimum amount of force.

27. The invention in accordance with claim 26 wherein a manually operated pulley mechanism is rotatably coupled with said conveyor for permitting the conveyor to be manually actuated.

References Cited by the Examiner
UNITED STATES PATENTS

| | | | |
|---|---|---|---|
| 1,797,503 | 3/1931 | Hillpot | 119—35 |
| 2,111,336 | 3/1938 | Schlottmann | 119—35 |
| 2,244,082 | 6/1941 | Reyniers | 128—1 |
| 2,311,640 | 2/1943 | Cornell | 119—21 |
| 2,559,654 | 7/1951 | Netteland | 128—1 |
| 2,703,570 | 3/1955 | Young | 128—1 |
| 2,705,489 | 4/1955 | Trexler | 128—1 |
| 3,051,163 | 8/1962 | Trexler | 23—259 X |
| 3,151,929 | 10/1964 | Potapenko | 21—74 |
| 3,254,448 | 6/1966 | Ruthner | 47—1.2 |

SAMUEL KOREN, *Primary Examiner.*

ALDRICH F. MEDBERY, *Examiner.*